United States Patent Office 3,121,712
Patented Feb. 18, 1964

3,121,712
COPPER COMPLEX TRIAZINE MONOAZO
DYESTUFFS
Alistair Howard Berrie, Alec Mee, and Cyril Eric Vellins, Manchester, England, assignors to Imperial Chemical Industries Limited, London, England, a corporation of Great Britain
No Drawing. Filed Feb. 26, 1962, Ser. No. 175,815
6 Claims. (Cl. 260—146)

This invention relates to new monoazo dyestuffs and more particularly it relates to new water-soluble metalliferous monoazo dyestuffs which contain at least one dihalogeno-s-triazine group and which are valuable for the colouration of cellulose in deep shades fast to washing.

According to the invention there are provided, as water-soluble monoazo dyestuffs, the complex copper derivatives of the compounds of the formula:

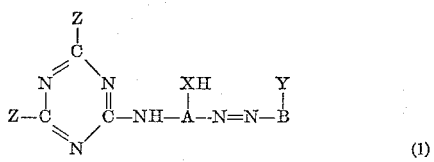

(1)

wherein
A represents a radical of the benzene series, carrying X in ortho position to the azo group;
B represents the radical of a coupling component carrying Y in a position vicinal to the azo group,
—X— represents the radical —$(CO)_nO$— where $n$ is 0 or 1
Y represents hydroxyl, an amino or a substituted amino group, and Z represents a halogen atom.

In order to have solubility in water, the new monoazo dyestuffs should contain at least one strongly acid water-solubilising group, such as a sulphonic acid group or a carboxylic acid group which does not take part in the complex metal formation, and preferably between two and four such groups in the molecule.

The new monoazo dyestuffs may be obtained by reacting together a cyanuric halide and a water-soluble complex-copper monoazo compound which is represented in the copper-free state by the formula:

(2)

wherein A, B, X and Y have the meanings given above, using one molecular proportion of the cyanuric halide for each acylatable amino group present in the monoazo compound.

As examples of cyanuric halides which may be used, there may be mentioned, for example cyanuric bromide and, preferably, cyanuric chloride.

The water-soluble complex-copper monoazo compounds may be obtained by treating a copper-free amino monoazo compound of the formula:

(3)

wherein A, B and Y have the meanings given above and Q stands for a hydroxyl, carboxylic acid or lower alkoxy group with a copper-yielding agent, such as copper sulphate or cuprammonium sulphate (the latter being particularly useful when a de-alkylative coppering is required), by methods well known in themselves, for example by heating together the copper-free compound and the copper-yielding agent in aqueous solution.

The copper-free amino monoazo compounds of Formula 3 may themselves be obtained by first diazotising a diazo component of the benzene series which contains a hydroxyl, carboxylic acid or lower alkoxy group ortho to the amino group and which also contains a nitro or an acylamino group, and coupling with a coupling component which couples in vicinal position to a hydroxy, amino, monosubstituted amino, or an enolised or enolisable ketomethylene group, and then converting the nitro- or acylamino-group containing monoazo compound to the corresponding amino monoazo compound by reduction or hydrolysis, as the case may be.

As examples of suitable diazo components there may be mentioned, for example, 5-nitro-2-aminophenol, 6-nitro-2-aminophenol-4-sulphonic acid, 5-nitro-2-aminobenzoic acid, 2-nitro-5-aminoterephthalic acid, 2-nitro-5-amino-4-methoxybenzoic acid, 2:5-dimethoxy-4-nitroaniline, 4-acetylamino-2-aminoanisole, 4-acetylamino-2-aminophenol-6-sulphonic acid, 2:5-dimethoxy-4-acetylaminoaniline, 4-acetylamino-2-aminobenzoic acid and 6-acetylamino-2-aminophenol-4-sulphonic acid.

A wide variety of coupling components may be used to manufacture the nitro- or acylamino-group containing monoazo compounds.

Thus, there may be used o-coupling phenols, or p-coupling phenols which contain a second hydroxyl or an amino group in meta-position to the hydroxyl group and N-alkyl and N-aryl derivatives of these, m-phenylenediamines, naphthols, amino-naphthols and N-alkyl, N-aryl and N-acyl derivatives of these, and o-coupling naphthylamines or N-alkyl derivatives of these. There may also be used ketomethylene or enolised ketomethylene compounds such as beta-ketocarboxylic acid derivatives especially acetoacetarylides, and heterocyclic compounds containing the beta-ketomethylene group, especially pyrazolones.

As examples of phenols there may be mentioned p-cresol, 3-amino-4-methylphenol, resorcinol, m-aminophenol, 3-hydroxymethylaniline, 3-hydroxydiphenylamine, 3:4-dimethylphenol and 3-acetylamino-4-methylphenol. As examples of m-phenylene diamines there may be mentioned m-phenylene diamine itself, 4-methyl-1:3-phenylenediamine and 4-sulpho-1:3-phenylene diamine.

As examples of naphthols there may be mentioned 2-naphthol and naphthol sulphonic acids such as 1-naphthol-4- and 5-sulphonic acids, 2-naphthol-6-, 7- and 8-sulphonic acids, 1-naphthol-3:6- and 3:8-disulphonic acids, 2-naphthol-3:6- and 6:8-disulphonic acids, 1-naphthol-3:6:8-trisulphonic acid and 1:8-dihydroxynaphthalene-3:6-disulphonic acid; aminonaphthols containing a free coupling position ortho to the hydroxyl group such as 1-amino-8-naphthol-3:6- and 4:6-disulphonic acids, 2-amino-5-naphthol-7-sulphonic acid, 2-amino-5-naphthol-1:7-disulphonic acid, 2-amino-8-naphthol-6-sulphonic acid, 1-amino-5-naphthol-7-sulphonic acid, 2-amino-8-naphthol-3:6-disulphonic acid, 1-amino-8-naphthol-4-sulphonic acid, 1-amino-8-naphthol-2:4-disulphonic acid, N-alkyl derivatives of these preferably those containing 1 to 4 carbon atoms in the alkyl group, such as 1-methylamino-8-naphthol-3:6-disulphonic acid, 1-n-butylamino-8-naphthol-3:6-disulphonic acid, 2-ethylamino-5-naphthol-7-sulphonic acid and 2-n-butylamino-8-naphthol-6-sulphonic acid, 2-dimethylamino-8-naphthol-6-sulphonic acid, arylaminonaphthol sulphonic acids such as 1-phenylamino-8-naphthol-3:6-disulphonic acid and 2-phenylamino-5-naphthol-7-sulphonic acid; acylamino- and amino-acylamino-naphthol sulphonic acids such as 1-acetylamino-8-naphthol-3:6-disulphonic acid, 2-acetylamino-8-naphthol-6-sulphonic acid, 1-(3'-aminobenzoylamino)-8-naphthol-3:6-disulphonic acid, 2-(4'-aminobenzoylamino)-5-naphthol-7-sulphonic acid, 2-acetylamino-5-naphthol-7-sulphonic acid and 1-benzoylamino-8-naphthol-3:6-disulphonic acid.

As examples of naphthylamines there may be mentioned 1-naphthylamino-3:6-disulphonic acid, 2-naphthylamine-3:6-disulphonic acid, 1-naphthylamine-4-sulphonic acid and N-methyl-2-naphthylamine-7-sulphonic acid.

As examples of keto-methylene compounds there may be mentioned beta-ketocarboxylic acid amides such as benzoyl-acetoacetanilide, acetoacetanilide and derivatives of these containing for example, halogen atoms or methyl, lower alkoxy, acylamino, nitro, amino, carboxylic acid or sulphonic acid groups in the aryl nucleus. As examples, there may be mentioned 1-benzoylacetamino-3- or 4 - (4'- aminobenzoylamino) benzene, 3-acetoacetyl-aminobenzoic acid, 4-acetoacetylamino-benzene sulphonic acid, 3-acetoacetylaminochlorobenzene, 1-acetoacetyl-amino-4-aminobenzene-3-carboxylic acid, 1-acetoacetyl-amino-3-aminobenzene-4-sulphonic acid and 4-acetyl-aminonitrobenzene. More particularly, there may be used heterocyclic keto-methylene compounds such as 5-aminopyrazoles, barbituric acid and 3-methyl-5-pyrazolones, such as 1-(4'-sulphophenyl)-3-methyl-5-pyrazolone, 1-(6'-chloro-3'-methyl-4'-sulphophenyl)-3-methyl-5-pyrazolone, 1-(2':5'-dichloro-4'-sulphophenyl) - 3 -methyl-5-pyrazolone, 1-(2'-methyl-5'-sulphophenyl) - 3 -methyl-5-pyrazolone, 1-(2'-chloro-5'-sulphophenyl) - 3 -methyl-5-pyrazolone, 1-(4'-chloro-2'-sulphophenyl) - 3 -methyl-5-pyrazolone, 1-(2'-chloro-4'-methyl-5'- sulphophenyl) -3-methyl-5-pyrazolone, 1-(6'-chloro-4'-sulpho - 2'- methylphenyl)-3-methyl-5-pyrazolone, 1-(4'-methyl-2'- sulphophenyl)-3-methyl-5-pyrazolone, 1-(2':5'-disulphophenyl)-3-methyl-5-pyrazolone, 1-(4'-ethoxy-2'-sulphophenyl)-3-methyl-5-pyrazolone, 1-(2':4'-dichloro-5'-sulphophenyl)-3-methyl-5-pyrazolone, 1-(6'-chloro-3'-sulpho-2'-methyl-phenyl)-3-methyl-5-pyrazolone, 1-(3':5'-disulphophenyl)-3-methyl-5-pyrazolone, 1-(4'-carboxyphenyl)-3-methyl-5-pyrazolone, 1-(3'-carboxyphenyl)-3-methyl-5-pyrazolone, 1-(2'-carboxyphenyl)-3-methyl-5-pyrazolone, 1-phenyl-3-methyl-5-pyrazolone, 1-p-tolyl-3-methyl-5-pyrazolone, 3-methyl-5-pyrazolone, 1- (4':8'- disulpho-2'- naphthyl)-3-methyl-5-pyrazolone, 1-(6':8'- disulpho-2'- naphthyl)-3-methyl-5-pyrazolone, 1-(4'-sulpho-1'-naphthyl)-3-methyl-5-pyrazolone, 4-(3''-methylpyrazol-5''-on-1''-yl)-4'-acet-ylaminostilbene- 2:2'- disulphonic acid, 1- (4'- benzoyl-amino- 2'- sulphophenyl) - 3-methyl-5-pyrazolone, 1-(3'-acetylaminophenyl)-3-methyl-5-pyrazolone, 1-(3'- and 4'-aminophenyl)-3-methyl-5-pyrazolone, 1-(4''-acetylamino-4'-phenyl)phenyl-3-methyl-5-pyrazolone and the 3-carboxy, 3-carbomethoxy, 3-carbethoxy and other 3-lower carbalkoxy, and 3-carbamyl compounds corresponding to the above-mentioned 3-methyl pyrazolones.

In the manufacture of these nitro- or acylamino-group containing monoazo compounds, the diazo and coupling components must be so chosen that the compound obtained contains at least one strongly acidic water-solubilising group present in such a position that it is not eliminated during conversion to the amino monoazo compound and it does not take part in the subsequent metal-complex formation. Preferably the diazo and coupling components are so chosen that the compound obtained contains between 2 and 4 such groups.

The conversion of the nitro- or acylamino-group containing compound to the corresponding amino compound may be carried out by the usual methods, for example where the monoazo compound contains a nitro group it may be treated in aqueous solution with sodium sulphide, and where the monoazo compound contains any acyl-amino group it may be treated with aqueous alkali or aqueous acid.

The azo group may be protected during reduction of nitro to amino by prior chroming or cobalting, the metal atom being later removed by an agent such as oxalic acid or a mineral acid.

The process of the invention is preferably carried out in an aqueous medium at as low a temperature as possible, preferably below 5° C. and advantageously in a neutral or weakly acid solution in the presence of an acid-binding agent preferably sodium carbonate or bicarbonate.

The new dyestuffs may be isolated by customary technique for the isolation of water-soluble dyestuffs, usually by precipitating the dyestuff in the form of its sodium salt by adding sodium chloride to the reaction medium and filtering off and drying the resultant precipitate.

In order to lessen the removal, by hydrolysis, of the halogen atoms attached to the triazine nuclei of the new dyestuffs it is preferred to adjust the pH of the reaction medium to about 6.5 at the end of the reaction period and before isolating the new dyestuff. It has also been found advantageous to add certain buffers which dissolve in water to give an aqueous solution of pH between 5 and 8 at this point in the manufacturing process. Suitable buffers are mixtures of water-soluble salts of phosphoric acid, or of dialkylaminoaryl sulphonic acids, in which the alkyl groups contain at least 2 carbon atoms, and their alkali metal salts, which give an aqueous solution of pH about 6.5. These buffers may also be added with advantage to the dried dyestuff powder since the stability of the dyestuff in the powder is greatly enhanced thereby.

The new dyestuffs of the invention, in the form of their alkali-metal salts, are readily soluble in water. They are especially useful for the colouration of cellulose textile materials in conjunction with a treatment with an acid-binding agent, for example by the process described in United Kingdom specification No. 797,946, now Patent No. 3,004,593, wherein the coloured textile material is after-treated with an acid-binding agent, or by related processes wherein an acid-binding agent is applied to the textile material before or during the treatment with the dyestuff.

When so applied the new monoazo dyestuffs give a wide variety of shades, for example blue, violet, red, grey, orange, yellow and brown shades may be obtained according to the original choice of coupling component, which shades have a high fastness to severe washing and, usually, to light.

Those new azo dyestuffs wherein the portion —BY of Formula 1 stands for the radical

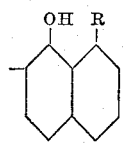

wherein the naphthalene nucleus contains two sulphonic acid groups and R is selected from the class consisting of H, amine, benzoylamino, dichloro-s-triazinylamine, lower alkylamino and phenylamino, are especially valuable dyes which yield blue, violet, and grey shades. These dyes fix well by a wide variety of application methods, including dyeing from long liquors or by padding or printing techniques and can be built up to give strong shades. Of particular value are those in which X stands for an oxygen atom and the radical —BY stands for one of the following radicals:

(a) 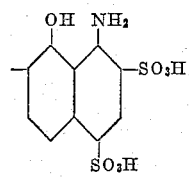

(b) 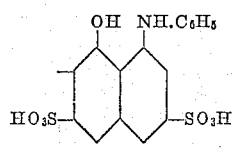

and (c)

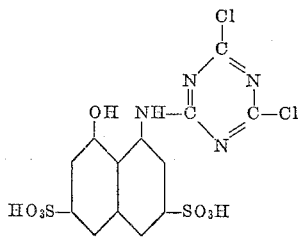

The invention is illustrated but not limited by the following examples in which parts are by weight:

*Example 1*

The copper complex of 1-phenylamino-7-(3'-amino-2'-hydroxyphenylazo) - 8 - naphthol - 3:5':6-trisulphonic acid (obtained as described below) is dissolved in water and added to a suspension of 1 molecular proportion of cyanuric chloride in ice cold water. The mixture is stirred for 2½ hours keeping the temperature below 5° C., sodium carbonate being added at intervals to neutralise the mixture to litmus.

Sufficient sodium chloride is then added to precipitate the dyestuff which consists substantially of the dichloro-s-triazinyl derivative of the cupiferous monoazo compound used as starting material.

The dyestuff is mixed with one-tenth of its weight of a 1:1.8 mixture of disodium hydrogen phosphate and potassium dihydrogen phosphate. The product so obtained colours cellulose fibres in dark blue shades when applied by the methods described above.

The cupiferous monoazo compound used as starting material in the above example may be obtained by coupling diazotised 6-nitro-2-aminophenol-4-sulphonic acid with 1-phenylamino-8-naphthol-3:6-disulphonic acid, heating the product so obtained with an aqueous solution of sodium sulphide for a few hours, and coppering the product obtained in the usual manner by heating with copper sulphate in aqueous acetic acid.

*Example 2*

In place of the cupiferous monoazo compound used as starting material in Example 1, there is used the copper complex of 1-phenyl-amino-7-(2'-hydroxy-5'-aminophenylazo)-8-naphthol-3:6-disulphonic acid (obtained as described below).

The dyestuff obtained colours cellulose in blue shades.

The cupiferous monoazo compound used as starting material may be obtained by coupling diazotised 4-acetylamino-2-aminoanisole with 1-phenylamino-8-naphthol-3:6-disulphonic acid, hydrolysing by heating with 4% sodium hydroxide solution for several hours, and heating with an ammoniacal solution of copper sulphate.

*Example 3*

In place of the cupiferous monoazo compound used as starting material in Example 1 there is used the copper complex of 1-phenylamino-7-(4'-amino-2'-hydroxyphenylazo)-8-naphthol-3:6-disulphonic acid (obtained as described in the final paragraph of Example 1, but using 5-nitro-2-aminophenol as diazo component).

The dyestuff obtained colours cellulose in blue shades.

*Example 4*

In place of the cupiferous monoazo compound used as starting material in Example 1 there is used the copper complex of 1-phenylamino-7-(4'-amino-2'-carboxyphenylazo)-8-naphthol-3:6-disulphonic acid (obtained as described in the final paragraph of Example 1, but using 5-nitro-2-aminobenzoic acid as diazo component).

The dyestuff obtained colours cellulose in greenish-blue shades.

*Example 5*

In place of the cupiferous monoazo compound used as starting material in Example 1 there is used the copper complex of 1-phenylamino-7-(2-hydroxy-5-aminophenylazo)-8-naphthol-3:3':6-trisulphonic acid (obtained as described in the final paragraph of Example 2, but using 4-acetylamino-2-aminophenol-6-sulphonic acid as diazo component and coppering in dilute aqueous acetic acid solution).

The dyestuff so obtained colours cellulose in blue shades.

*Example 6*

In place of the cupiferous monoazo compound used as starting material in Example 1 there is used the copper complex of 1-phenylamino-7-(4'-amino-2':5'-dicarboxyphenylazo)-8-naphthol-3:6-disulphonic acid (obtained as described in the final paragraph of Example 1 but using 2-nitro-5-aminoterephthalic acid as diazo component).

The dyestuff so obtained colours cellulose in greenish-blue shades.

*Example 7*

In place of the cupiferous monoazo compound used as starting material in Example 1 there is used the copper complex of 1-phenylamino-7-(4'-amino-2'-hydroxy-5'-carboxyphenylazo)-8-naphthol-3:6-disulphonic acid (obtained as described in the final paragraph of Example 1 but using 2-nitro-5-amino-4-methoxybenzoic acid as diazo component and coppering with ammoniacal copper sulphate).

The dyestuff so obtained colours cellulose in blue shades.

*Example 8*

In place of the cupiferous monoazo compound used as starting material in Example 1 there is used the copper complex of 2-acetylamino-6-(3'-amino-2'-hydroxyphenylazo)-5-naphthol-5':7-disulphonic acid (obtained as described in the final paragraph of Example 1, but using 2-acetylamino-5-naphthol-7-sulphonic acid as coupling component).

The dyestuff obtained colours cellulose in bluish-red shades.

*Example 9*

In place of the cupiferous monoazo compound used as starting material in Example 1 there is used the copper complex of 1-(3'-amino-2'-hydroxyphenylazo)-2-naphthol-3:5':6-trisulphonic acid (obtained as described in the final paragraph of Example 1 but using 2-naphthol-3:6-disulphonic acid as coupling component).

The dyestuff obtained colours cellulose in bluish-red shades.

*Example 10*

In place of the cupiferous monoazo compound used as starting material in Example 1 there is used the copper complex of 1-benzoylamino-7-(4'-amino-2':5'-dicarboxyphenylazo)-8-naphthol-3:6-disulphonic acid (obtained as described in the final paragraph of Example 1 but using 2-nitro-5-aminoterephthalic acid as diazo component and 1-benzoylamino-8-naphthol-3:6-disulphonic acid as coupling component).

The dyestuff so obtained colours cellulose in reddish-violet shades.

*Example 11*

In place of the cupiferous monoazo compound used as starting material in Example 1 there is used the copper complex of 1-(4'-amino-2':5'-dicarboxyphenylazo)-2-naphthol-6:8-disulphonic acid (obtained as described in the final paragraph of Example 1 but using 2-nitro-5-aminoterephthalic acid as diazo component and 2-naphthol-6:8-disulphonic acid as coupling component).

The dystuff so obtained colours cellulose in pink shades.

Example 12

Following the general procedure of Example 1, 2 molecular proportions of cyanuric chloride are condensed with 1 molecular proportion of the copper complex of 1-amino-7-(4'-amino-2'-hydroxy-5'-methoxyphenylazo)-8-naphthol-3:6-disulphonic acid.

The dyestuff so obtained colours cellulose in grey shades.

The cupiferous monoazo compound used as starting material in the above example may be obtained by coupling diazotised 2:5-dimethoxy-4-acetylaminoaniline with 1:8-aminonaphthol-3:6-disulphonic acid, hydrolysing and treating with ammoniacal copper sulphate.

Example 13

In place of the cupiferous monoazo compound used as starting material in Example 1 there is used the copper complex of 1-(4'-sulphophenyl)-3-methyl-4-(2''-hydroxy-3''-amino-5''-sulphophenylazo)-5-pyrazolone.

The dyestuff so obtained colours cellulose in orange brown shades of high light fastness.

The starting material may be obtained by coupling diazotised 6-acetylamino-2-aminophenol-4-sulphonic acid with 1-(4'-sulphophenyl)-3-methyl-5-pyrazolone, hydrolysing the acetylamino group and coppering in dilute aqueous acetic acid solution.

Example 14

In place of the cupiferous monoazo compound used as starting material in Example 1 there is used the copper complex of 2-(3'-amino-2'-hydroxyphenylazo)-1-naphthol-3:5':6-trisulphonic acid.

The dyestuff colours cellulose fibres in reddish-violet shades.

The starting material may be obtained as described in the last paragraph of Example 1 except that 1-naphthol-3:6-disulphonic acid replaces 1-phenylamino-8-naphthol-3:6-disulphonic acid.

Example 15

In place of the cupiferous monoazo compound used as starting material in Example 1 there is used the copper complex of the monoazo-compound obtained by diazotisation of 6-acetylamino-2-aminophenol-4-sulphonic acid and coupling the diazonium compound obtained with 1-acetoacetylaminobenzene-4-sulphonic acid, hydrolysing in aqueous hydrochloric acid and coppering in dilute aqueous acetic acid medium.

The dyestuff so obtained colours cellulose in reddish yellow shades.

Example 16

In place of the cupiferous monoazo compound used as starting material in Example 1 there is used the copper complex of 1-butylamino-7-(2'-hydroxy-3'-aminophenylazo)-8-naphthol-3:5':6-trisulphonic acid.

The dyestuff obtained colours cellulose in blue shades.

The starting material may be obtained by coupling diazotised 6-nitro-2-aminophenol-4-sulphonic acid with 1-butylamino-8-naphthol-3:6-disulphonic acid, converting to the chromium complex by heating with chromium acetate in dilute aqueous acetic acid solution, reducing the nitro group, removing the chromium by heating with aqueous oxalic acid solution and coppering in aqueous acetic acid solution.

Example 17

In place of the cupiferous monoazo compound used as starting material in Example 1 there is used the copper complex of 2-(3'-amino-2'-hydroxyphenylazo)-1-naphthylamine-4:5'-disulphonic acid.

The dyestuff colours cellulose fibres bluish red shades.

The starting material may be obtained by the method described for manufacture of the starting material used in Example 16 except that 1-naphthylamine-4-sulphonic acid is used in place of 1-butylamino-8-naphthol-3:6-disulphonic acid.

Example 18

In place of the cupiferous monoazo compound used as starting material in Example 12 there is used the copper complex of 2-amino-6-(2'-hydroxy-5'-aminophenylazo)-5-naphthol-1:7-disulphonic acid.

The dyestuff so obtained colours cellulose in violet shades.

The starting material may be obtained by coupling diazotised 4-acetylamino-2-aminoanisole with 2-amino-5-naphthol-1:7-disulphonic acid, hydrolysing and treating the product so obtained with ammoniacal copper sulphate.

Example 19

In place of the cupiferous monoazo compound used as starting material in Example 12, there is used the copper complex of 2-amino-7-(2'-hydroxy-5'-aminophenylazo)-8-naphthol-3:6-disulphonic acid.

The dyestuff so obtained colours cellulose in grey shades.

The starting material may be obtained by coupling diazotised 4-acetylamino-2-aminoanisole with 2-amino-8-naphthol-3:6-disulphonic acid, hydrolysing, and treating the product so obtained with ammoniacal copper sulphate.

Example 20

In place of the cupiferous monoazo compound used as starting material in Example 1, there is used the copper complex of 1-phenylamino-7-(5-amino-2-carboxyphenylazo)-8-naphthol-3:6-disulphonic acid.

The dyestuff obtained colours cellulose in blue-grey shades.

The starting material may be obtained by coupling diazotised 4-acetylamino-2-aminobenzoic acid with 1-phenylamino-8-naphthol-3:6-disulphonic acid, hydrolysing and coppering in dilute aqueous acetic acid.

Example 21

In place of the cupiferous monoazo compound used as starting material in Example 1 there is used the copper complex of 2-phenylamino-6-(3'-amino-2'-hydroxyphenylazo)-5-naphthol-5':7-disulphonic acid.

The dyestuff so obtained colours cellulose fibres red violet shades.

The starting material may be obtained by the method described in the final paragraph of Example 16, except that the 1-butylamino-8-naphthol-3:6-disulphonic acid is replaced by 2-phenylamino-5-naphthol-7-sulphonic acid.

Example 22

In place of the coppered monoazo compound used in Example 12, there is used the copper complex of 1-amino-7-(3'-amino-2'-hydroxyphenylazo)-8-naphthol-3:5':6 - trisulphonic acid.

The dyestuff so obtained colours cellulose in violet shades.

The coppered monoazo compound used as starting material in the above example may be obtained by coupling diazotised 6-acetylamino-2-aminophenol-4-sulphonic acid with 1-amino-8-naphthol-3:6-disulphonic acid in alkaline media, hydrolysing the acetyl groups and treating with copper acetate.

Example 23

In place of the coppered monoazo compound used in Example 12, there is used the copper complex of 1-amino-7-(5'-amino-2'-hydroxyphenylazo)-8-naphthol - 3:3':6-trisulphonic acid.

The dyestuff so obtained colours cellulose in blue violet shades.

The coppered monoazo compound used as starting material in the above example may be obtained by coupling diazotised 4-acetylamino-2-aminophenol-6-sulphonic acid with 1-amino-8-naphthol-3:6-disulphonic acid in alakli media hydrolysing the acetyl group and treating with copper acetate.

*Example 24*

In place of the coppered monoazo compound used in Example 1, there is used the copper complex of 1-amino-7-(3'-amino-2'-hydroxyphenylazo)-8-naphthol - 2:4:5'-tri-sulphonic acid.

The dyestuff so obtained colours cellulose in blue violet shades.

The coppered monoazo compound used as starting material in the above example may be obtained by coupling diazotised 6-acetylamino-2-aminophenol-4-sulphonic acid with 1-amino-8-naphthol-2:4-disulphonic acid, hydrolysing and treating with copper sulphate.

*Example 25*

In place of the coppered monoazo compound used in Example 1, there is used the copper complex of 1-amino-7-(4'-amino-2'-hydroxyphenylazo)-8-naphthol - 2:4 - di-sulphonic acid.

The dyestuff so obtained colours cellulose in blue violet shades.

The coppered monoazo compound used as starting material in the above example may be obtained by coupling diazotised 5-nitro-2-aminophenol with 1-amino-8-napthol-2:4-disulphonic acid, metallising with cobalt acetate, reducing with an aqueous solution of sodium sulphide, removing the cobalt by treating with hydrochloric acid and then treating with copper sulphate.

*Example 26*

In place of the coppered monoazo compound used in Example 1, there is used the copper complex of 1-amino-7-(5'-amino-2'-hydroxyphenylazo)-8-naphthol - 2:3':4-tri-sulphonic acid.

The dyestuff so obtained colours cellulose in reddish blue shades.

The coppered monoazo compound used as starting material in the above example may be obtained by coupling diazotised 4-acetylamino-2-aminophenol-6-sulphonic acid with 1-amino-8-naphthol-2:4-disulphonic acid, hydrolysing and treating with copper.

This application is a continuation-in-part of application Serial No. 854,587, filed November 23, 1959, now abandoned.

We claim:
1. The 1:1-copper complexes of the compounds of the formula:

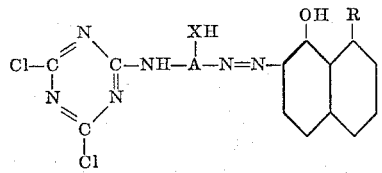

wherein
A represents a benzene radical carrying the group XH in ortho position to the azo group, and selected from the class consisting of unsubstituted phenyl, monosulfophenyl, monocarboxyphenyl, and monomethoxyphenyl;

X represents the group —(CO)$_n$O— where $n$ is one of the numbers 0 and 1;
R represents a member selected from the class consisting of H, NH$_2$, C$_6$H$_5$CONH, C$_6$H$_5$NH, lower alkylamino and dichloro-s-triazinylamino; and the naphthalene nucleus contains 2 sulfonic acid groups.

2. The 1:1-copper complex of the compound of the formula:

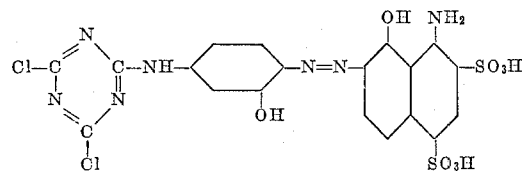

3. The 1:1-copper complex of the compound of the formula:

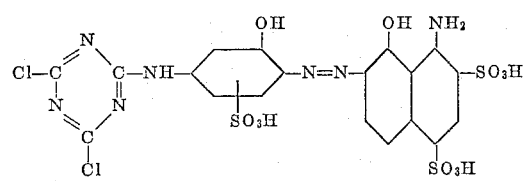

4. The 1:1-copper complex of the compound of the formula:

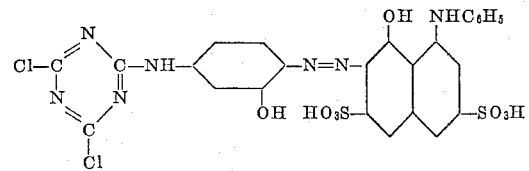

5. The 1:1-copper complex of the compound of the formula:

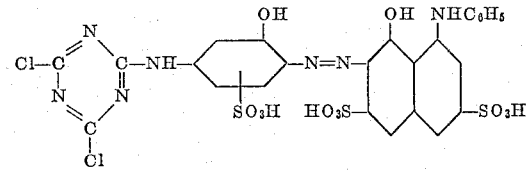

6. The 1:1-copper complex of the compound of the formula:

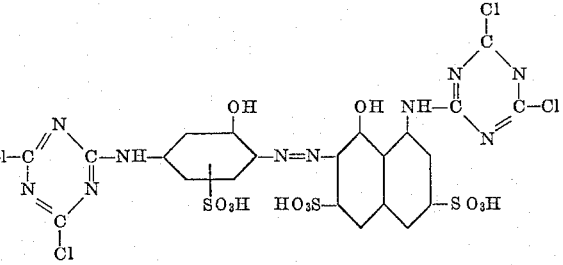

References Cited in the file of this patent

UNITED STATES PATENTS 2,929,809   Menzi et al. _____ Mar. 22, 1960